United States Patent Office 3,314,993
Patented Apr. 18, 1967

3,314,993
CARBAMOYL PHOSPHINES
Grace Peters Papp and Sheldon A. Buckler, Stamford, Conn., assignors to American Cyanamid Company, Stamford, Conn., a corporation of Maine
No Drawing. Filed Sept. 11, 1963, Ser. No. 308,082
3 Claims. (Cl. 260—557)

The present invention relates to tertiary dicarbamoyl-substituted phosphines of the formula $$\overset{(O)_n}{\underset{}{R\overset{\|}{P}(CONH_2)_2}}$$

wherein R is selected from the group consisting of substituted and unsubstituted, branched and straight chain alkyl $C_1$–$C_{18}$, substituted and unsubstituted cycloalkyl, such as cyclohexyl, substituted and unsubstituted aryl, such as phenyl and naphthyl, and $n$ is selected from 0 and 1.

Generically the reaction of the present invention may be described as follows:

$$RPH_2 + (iso)\text{cyanic acid} \longrightarrow RP(CONH_2)_2 / + O \longrightarrow$$
$$\overset{O}{\underset{}{R\overset{\|}{P}(CONH_2)_2}}$$

According to a typical embodiment a saturated aqueous solution of potassium cyanate is intermingled with a solution of butylphosphine in an organic acid, such as acetic acid, at a temperature in a range of 60° C. to 80° C. under nitrogen. Reaction may be represented as follows:

$$C_4H_7PH_2 + 2KOCN \xrightarrow{H_2O} C_4H_7P(CONH_2)_2$$

Typical primary phosphines within the scope of the instant invention are phenylphosphine, cyclohexylphosphine, butylphosphine, hexylphosphine, octylphosphine, decylphosphine, heptadecylphosphine, octadecylphosphine, isobutylphosphine, propylphosphine, ethylphosphine, methylphosphine, dodecylphosphine, isopropylphosphine, benzylphosphine, trifluoromethylphosphine, 2-butoxy-ethylphosphine, cyanoethylphosphine, para-methylphenylphosphine, cyclopentylphosphine, para-chlorophenylphosphine, and the like. From these typical reactants it will be noted that representative inert substituents within the purview of the present invention are lower alkyl, lower alkoxy, phenyl, halogen, cyano, and the like.

As indicated hereinabove, an aqueous system may be employed, and is preferably employed, to produce the products of the present invention. However, the reaction is effective using an inert organic solvent, such as methylcyanide, tetrahydrofuran, dioxane, dimethyl ether of ethylene glycol, and the like.

Peculiarly enough the novel product of the present invention cannot be prepared by means taught in the art. Buckler, Journal of Organic Chemistry, 24, 1460 (1959) discloses preparation of carbamoyl phosphines (and oxides) with substituents on the nitrogen atom by the interaction of phosphine and alkyl or aryl isocyanates. The Buckler process when applied to the reactants contemplated herein does not, for some reason or other, produce the product of the present invention assuming the substitution of HOCN, or its alkali metal derivative, for the substituted isocyanates of the Buckler reference. The reason for this, as just hinted, is not understood.

The reactions contemplated herein may be carried out at a temperature in the range of −10° C. to 200° C., preferably 22° C. to 110° C. The reactants are usually brought together, according to the instant invention, in stoichiometric amounts. An excess of either reactant, however, relative to the other may be employed without affecting the product in any way. Of course, too great an excess is unmanageable and impractical.

It is essential that the reaction be carried out under substantially anaerobic conditions, preferably under nitrogen, or some similar inert gas. When substantial air or oxygen is present at recovery the corresponding oxide is produced. While atmospheric, superatmospheric or subatmospheric pressures may be employed, the mixing sequence of the reactants is not critical; consequently, a continuous, semi-continuous or batch process is suitable.

The (iso)cyanic acid reactant may be introduced into the reaction mixture or it may be generated (in situ) therein by any conventional manner. Typically, an alkali metal derivative of (iso)cyanic acid, such as KOCN, NaOCN, or the like, may be admixed with the phosphine reactant in the presence of an acid and (iso)cyanic acid thus liberated. Typical useful acids are mineral acids, such as HCl, HBr, $H_2SO_4$, and the like, organic acids, such as acetic acid, propionic acid, and the like.

The corresponding oxides of the dicarbamoyl phosphines produced herein may also be prepared as described in copending application Ser. No. 824,169, filed July 1, 1959, now U.S. Patent 3,145,234, issued August 18, 1964, by the use of a peroxide, such as hydrogen peroxide di-nitrogen tetroxide. Reaction is carried out with significant ease. This copending application is incorporated herein by reference.

The novel dicarbamoyl-substituted tertiary phosphine and phosphine oxides of the present invention, prepared as described above have direct utility as flame-proofing agents. For instance, cotton cloth may be immersed in a suitable solution containing a small amount (e.g. from 0.5% to 10%) of any one of the novel compounds of the present invention, and the cloth subsequently dried. The thus-treated cotton cloth exhibits desirable fire retardance on direct contact with a flame.

The present invention will best be understood from the following examples:

EXAMPLE I

*Dicarbamoylphenylphosphine*

Twelve grams of phenylphosphine in 50 cubic centimeters of acetic acid is treated, under nitrogen, at a temperature of 70° C. to 80° C. with 24.3 grams of KOCN in 60 cubic centimeters of $H_2O$. The product separates as a supernatant solid during the 2 hours reaction time with stirring. Filtration of the mixture gives 5.4 grams of dicarbamoylphenylphosphine.

Recrystallization of the solid from methanol gives product, melting point 159° C.–161° C., with the following analysis: Calculated for C, 48.98; H, 4.63; N, 14.28; P, 15.78. Found: C, 48.36; H, 5.00; N, 14.50; P, 15.75.

EXAMPLE II

*Cyclohexyldicarbamoylphosphine oxide*

4.3 grams of cyclohexylphosphine in 40 cubic centimeters of acetic acid is treated, under nitrogen, with 12 grams of KOCN in 25 cubic centimeters $H_2O$. The mixture is refluxed 3 hours, and then cooled and poured onto ice water. 0.6 gram of product cyclohexyldicarbamoylphosphine separates and the mixture is then filtered. Upon recrystallization of the product from methanol cyclohexyldicarbamoylphosphine oxide is recovered, indicating conversion to the oxide due to the presence of air during recrystallization.

Analysis calculated for C, 47.99; H, 8.06; P, 17.68. Found: C, 47.79; H, 8.03; P, 17.30.

Additional cyclohexyldicarbamoylphosphine oxide product is obtained by treating the aqueous filtrate which remains with 4.2 cubic centimeters of concentrated $H_2SO_4$ and concentrating under reduced pressure. Extraction of the thus formed residue with CH₃CN leaves 11.5 grams of insoluble K₂SO₄. Evaporation of the extract leaves 4.6 grams of oily residue with the same spectrum as the recrystallized material, viz, cyclohexyldicarbamoylphosphine oxide. Crystallization is induced by trituration with small amounts of CH₃CN and isopropanol.

TABLE I

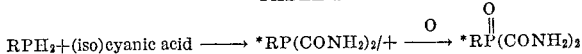

| Example | R | (iso)Cyanic Acid Source | Temp., °C. | Water | Solvent | Oxidizing Agent |
|---|---|---|---|---|---|---|
| III | Methyl | KOCN plus acetic acid | 70 | H₂O | | Hydrogen peroxide. |
| IV | Octyl | NaOCN plus propionic acid | 100 | H₂O | | Air. |
| V | Benzyl | KOCN plus propionic acid | −15 | None | CH₃CN | Air. |
| VI | Cyclopentyl | (iso)Cyanic acid gas | 70 | do | CH₃CN | H₂SO₄. |
| VII | Para-methylphenyl | do | 95 | do | Dioxane | Air. |
| VIII | Trifluoromethyl | KOCN plus acetic acid | 55 | do | Tetrahydrofuran | Air. |
| IX | Dodecyl | NaOCN plus HCl | 110 | H₂O | | Hydrogen peroxide. |
| X | Isobutyl | KOCN plus HCl | 100 | H₂O | | Air. |
| XI | 2-cyanoethyl | (iso)Cyanic acid gas | 150 | H₂O | | Air. |
| XII | Parachlorophenyl | do | 80 | H₂O | | Air. |
| XIII | 2-butoxyethyl | do | 25 | H²O | | Air. |

*R in the product formulae is the same as in RPH₂.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A dicarbamoyl-substituted tertiary organic phosphine of the formula

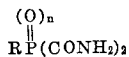

wherein R is a member selected from the group consisting of substituted and unsubstituted, branched and straight chain alkyl of from 1 to 18 carbon atoms, cyclopentyl, cyclohexyl, substituted and unsubstituted phenyl, substituted and unsubstituted naphthyl, and $n$ is selected from 0 and 1, wherein the substituents for alkyl are selected from the group consisting of cyano, phenyl, halogen, and lower alkoxy and the substituents for phenyl and naphthyl are selected from the group consisting of cyano, lower alkyl, halogen and lower alkoxy.

2. Dicarbamoylphenylphosphine.
3. Cyclohexyldicarbamoylphosphine oxide.

References Cited by the Examiner

UNITED STATES PATENTS

| 2,969,390 | 1/1961 | Buckler | 260—557 |
| 3,052,719 | 9/1962 | Buckler et al. | 260—561 |
| 3,145,234 | 8/1964 | Buckler et al. | 260—465.1 |
| 3,214,457 | 10/1965 | Papp et al. | 260—465.4 |

OTHER REFERENCES

Fox et al.: The Chemistry of Organo-Phosphorus Compounds (Naval Research Laboratory Report C-3323), page 21, Washington, D.C., Armed Services Technical Information Agency, 1948.

Houben-Weyl, Methoden der Organischen Chemie, volume 12/1 (Organische Phosphor Verbindungen), pp. 140–44, Stuttgart, Georg Thieme Verlag, 1963.

WALTER A. MODANCE, *Primary Examiner.*

NATALIE TROUSOF, *Assistant Examiner.*